United States Patent
Chiang et al.

(10) Patent No.: US 8,966,399 B2
(45) Date of Patent: Feb. 24, 2015

(54) GRAPHICAL MENU INTERFACE, IMPLEMENTING METHOD THEREOF, AND OPERATING METHOD THEREOF

(75) Inventors: Chi-Pang Chiang, Taoyuan County (TW); Te-Chuan Liu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1320 days.

(21) Appl. No.: 12/036,284

(22) Filed: Feb. 24, 2008

(65) Prior Publication Data

US 2008/0282194 A1 Nov. 13, 2008

(30) Foreign Application Priority Data

May 10, 2007 (TW) ................................ 96116612 A

(51) Int. Cl.
*G06F 3/048* (2013.01)
*G06F 3/0482* (2013.01)

(52) U.S. Cl.
CPC .................................... *G06F 3/0482* (2013.01)
USPC ............................ 715/835; 715/764; 715/837

(58) Field of Classification Search
USPC ......... 715/835, 864, 775, 778, 779, 781, 788, 715/789
See application file for complete search history.

(56) References Cited

U.S. PATENT DOCUMENTS

| | | | |
|---|---|---|---|
| 6,121,968 A | 9/2000 | Arcuri et al. | |
| 6,160,553 A * | 12/2000 | Robertson et al. | 715/767 |
| 6,243,724 B1 * | 6/2001 | Mander et al. | 715/273 |
| 6,968,511 B1 * | 11/2005 | Robertson et al. | 715/835 |
| 7,146,576 B2 * | 12/2006 | Chang et al. | 715/848 |
| 7,543,245 B2 * | 6/2009 | Irimajiri | 715/836 |
| 7,562,312 B2 * | 7/2009 | Rochford et al. | 715/848 |
| 8,751,948 B2 * | 6/2014 | Wetzer et al. | 715/769 |
| 2001/0028368 A1 | 10/2001 | Swartz et al. | |
| 2003/0117440 A1 * | 6/2003 | Hellyar et al. | 345/767 |
| 2005/0283734 A1 * | 12/2005 | Santoro et al. | 715/765 |
| 2006/0173594 A1 * | 8/2006 | Kolletzki | 701/36 |
| 2007/0271528 A1 * | 11/2007 | Park et al. | 715/810 |
| 2008/0059904 A1 * | 3/2008 | Abbey et al. | 715/802 |

(Continued)

FOREIGN PATENT DOCUMENTS

| | | |
|---|---|---|
| EP | 0103317 | 3/1984 |
| TW | 200403582 | 3/2004 |

(Continued)

OTHER PUBLICATIONS

"Office Action of Taiwan Counterpart Application", issued on Jul. 14, 2011, p. 1-p. 12.

*Primary Examiner* — Dino Kujundzic
(74) *Attorney, Agent, or Firm* — Jianq Chyun IP Office

(57) ABSTRACT

A graphical menu interface, an implementing method thereof, and an operating method thereof are provided. In the implementing method of the graphical menu interface, m function groups are provided first, and each of the function groups has at least one function. Then, an operating frame related to each function group is obtained and used as the menu icon representing a corresponding function group in the graphical menu interface. Finally, there are n function groups displayed on the screen, and the corresponding operating frames are used as the menu icons of these n function groups in the graphical menu interface. As a result, users can infer the position of each function in the graphical menu interface more intuitively, and thus the convenience in operating the graphical menu is improved.

29 Claims, 6 Drawing Sheets

(56) References Cited

U.S. PATENT DOCUMENTS

2008/0062141 A1* 3/2008 Chandhri ............... 345/173
2008/0307359 A1* 12/2008 Louch et al. ........... 715/835

FOREIGN PATENT DOCUMENTS

TW 200609800 3/2006
TW 200636551 10/2006

* cited by examiner

GRAPHICAL MENU INTERFACE, IMPLEMENTING METHOD THEREOF, AND OPERATING METHOD THEREOF

CROSS-REFERENCE TO RELATED APPLICATION

This application claims the priority benefit of Taiwan application serial no. 96116612, filed on May 10, 2007. The entirety of the above-mentioned patent application is hereby incorporated by reference herein and made a part of this specification.

BACKGROUND OF THE INVENTION

1. Field of the Invention

The present invention is related to a menu interface and an implementing and an operating methods thereof. More particularly, the present invention is related to a graphical menu interface of a hand-held electronic device and an implementing and an operating methods thereof.

2. Description of Related Art

To keep up with the bustling pace of modern human life, a variety of hand-held electronic devices which are readily portable and compact have also flourished. Taking hand-held communication devices such as a PDA cellular phone or a smart phone for example, it is not only equipped with all the functions a traditional communication device has, but it also allows users to achieve purposes such as writing documents, receiving and sending e-mails, surfing the internet or communicating in instant message software through the Windows operating system built therein. In other words, the hand-held communication device not only can be used for making phone calls, but also has all kinds of diversified functions as a small personal computer. With advances in the wireless internet technology, use of these functions is no longer temporally and spatially confined and has gradually grown into a trend among the modern people who value efficiency and time management.

Most of the Windows operating systems built in the hand-held communication device use the user interfaces similar to those adopted in the personal computers. However, as limited by the volume of the hand-held communication device, if a function menu is to be displayed on a small screen, the size of the option itself needs to be reduced. Accordingly, users may very possibly not be able to quickly and clearly inspect the contents of the menu because the fonts and the icons are too small.

Further, since the Windows operating system provides numerous types of functions, which cannot all be displayed on the screen simultaneously, all the functions have to be arranged within the "start" function chart in a multi-tiered menu under a standby mode. For users not familiar with the Windows operating system, or for those who only use the hand-held communication device for the first time, it may take considerable time for them to memorize the positions of each of the functions in the menu. When users want to open a certain function, they not only have to know the position of the function in the menu, but also have to keep clicking on different tiers of the menu to arrive at the exact position of the function in the menu and thereby opening and operating the function. In contrast, if users do not know the position of the function in the menu, they may have to go through many trials to locate the function in the "start" function chart. It follows that these actions would take much unnecessary time for operation that can be otherwise saved.

Taking the common user interface of the Windows operating system for example, users not only need to memorize the positions of each of the functions in the menu, but also need to click on tier after tier in the menu to arrive at the corresponding option of the function they desire to open. All these situations cause inconvenience in use, and thus users cannot operate conveniently and rapidly.

SUMMARY OF THE INVENTION

In view of the above-mentioned, the present invention is directed to an implementing method of a graphical menu interface, in which an operating frame related to a function group serves as a menu icon in a menu interface. Accordingly, users can intuitively understand functions of all function groups.

The present invention is directed to an operating method of a graphical menu interface, which is used for restoring a frame and an operating status on a screen to a status of the function group during its last operation after a user clicks on one of the function groups.

The invention is directed to a graphical menu interface, which represents function groups with operating frames and function icons. By displaying the operating frames and the function icons simultaneously on the screen, users can easily obtain information of all device functions displayed on the screen and thereby operate the functions promptly.

The present invention provides an implementing method of a graphical menu interface used for implementing a graphical menu interface and displaying the graphical menu interface on a screen of a hand-held electronic device. The implementing method includes the following steps. First, m function groups are provided. Each of the function groups includes at least one function, and m is a positive integer. Afterwards, operating frames related to the function groups respectively are obtained. Finally, n function groups are displayed on the screen. Operating frames respectively corresponding to the n function groups serve as menu icons of the n function groups in the graphical menu interface, and n is a positive integer smaller than or equal to m.

According to one embodiment of the present invention, the method further includes determining n function groups among m function groups to be displayed before the n function groups are displayed on the screen. A method of determining the n function groups includes selecting n function groups that have been recently performed or are performed most frequently among the m function groups.

According to one embodiment of the present invention, the step of obtaining the operating frames related to the function groups includes capturing the operating frame last displayed during operation of the function groups.

According to one embodiment of the present invention, the step of obtaining the operating frames related to the function groups includes capturing operating frames at a set interval during operation of the function groups. The operating frame last captured is further used as the menu icon for the corresponding function group when the operating frames of the selected n function groups are used as the menu icons in the graphical menu interface.

According to one embodiment of the present invention, the step of obtaining the operating frame related to the function group includes capturing one of all operating frames related to operation of the function group.

According to one embodiment of the present invention, the operating frame includes a sub-menu of the function group, operating interfaces of the functions in the function group, user interfaces or pictures related to the function group.

According to one embodiment of the present invention, the method further includes recording an operating status of each of the function groups after the function groups are provided. In addition, a simplified operating interface can be generated correspondingly based on the operating status and a sub-menu of the function group can be further combined to serve as the operating frame of the function group.

According to one embodiment of the present invention, the step of displaying the graphical menu interface on the screen includes partitioning the screen into x blocks. N blocks among the x blocks display respectively corresponding operating frames of the n function groups, and x is a positive integer larger than or equal to n. Moreover, the step of partitioning the screen into x blocks includes partitioning the screen into x grids.

According to one embodiment of the present invention, in the step of displaying the graphical menu interface on the screen, each of the operating frames serves as a first pattern of a menu icon, and each of the operating frames is added with the function pattern corresponding to the function group to serve as a second pattern of the menu icon. The step of displaying the graphical menu interface on the screen includes lightening and dimming the operating frames.

From another aspect, the present invention provides an operating method of a graphical menu interface used for operating a graphical menu interface displayed on a screen of a hand-held electronic device. The operating method includes the following steps. First, the graphical menu interface is displayed on the screen. The graphical menu interface includes a plurality of menu icons corresponding to a plurality of function groups. Each of the menu icons includes an operating frame related to the corresponding function group. Thereafter, a selection instruction is received to select one of the menu icons. Finally, the operating frame of the selected menu icon is opened.

According to one embodiment of the present invention, the step of opening the operating frame of the selected menu icon further includes enlarging the operating frame of the function group displayed on the screen or displaying the same in a full screen mode.

According to one embodiment of the present invention, the operating frame includes a sub-menu of a function group, operating interfaces of the functions in the function group, user interfaces or pictures related to the function group.

According to one embodiment of the present invention, after the step of opening the operating frame of the selected menu icon, the method further includes receiving a selection instruction to select a sub-option in a sub-menu from the operating frame and displaying the operating frame corresponding to the sub-option.

According to one embodiment of the present invention, after the step of opening the operating frame of the selected menu icon, the method further includes receiving an operation instruction to perform a corresponding function in the operating interface.

According to one embodiment of the present invention, the step of performing the corresponding function in the operating interface further includes capturing operating frames regularly and recording operating statuses of the operating frames. When a return instruction is received, the corresponding menu icon in the graphical menu interface is updated with the last captured operating frame and the graphical menu interface is thus further displayed.

According to one embodiment of the present invention, the step of opening the operating frame of the selected menu icon further includes receiving a return instruction to capture the operating frame last displayed and recording the operating status of the operating frame. The corresponding menu icon in the graphical menu interface is updated with the last captured operating frame so as to further display the graphical menu interface.

According to one embodiment of the present invention, the screen includes a touch screen and the step of receiving a selection instruction to select a menu icon includes receiving the selection instruction through the touch screen.

From another viewpoint, the present invention provides a graphical menu interface including a plurality of menu icons respectively corresponding to a plurality of function groups. Each of the menu icons includes an operating frame and a function pattern of the corresponding function group. Each of the operating frames is a first pattern of the corresponding menu icon, and each of the function patterns is a second pattern of the corresponding menu icon.

According to one embodiment of the present invention, each of the menu icons further includes a selection region for receiving a selection instruction to select a corresponding menu icon. The selection region includes a region displaying function patterns.

According to one embodiment of the present invention, the operating frame includes a frame last displayed during operation of the function groups.

According to one embodiment of the present invention, the operating frame includes a frame last captured among the frames regularly captured at a set interval during operation of the function groups.

According to one embodiment of the present invention, the operating frame includes a sub-menu of the function group, operating interfaces of one of the functions in the function group, user interfaces or pictures related to the function group.

The operating frames of the function groups serve as the menu icons in the graphical menu interface of the present invention, which allows users to be able to clearly locate the position of each of the functions in the graphical menu. When users select a certain function group, the frame and the state of the latest operation of the function group is automatically displayed for users to proceed with further operation so as to improve use efficiency.

In order to make the aforementioned and other objects, features and advantages of the present invention more comprehensible, preferred embodiments accompanied with figures are described in detail below.

DESCRIPTION OF EMBODIMENTS

Generally, the design quality of a user interface in an electronic device has a great impact on the level of convenience in operating the electronic device. For users, a user interface having clear function classifications and easy to switch among different types of functions can allow more smooth and proficient operation when users are using an electronic device. As a result, the time spent on learning to operate the electronic device is shortened and the use efficiency is thereby improved. The present invention is a graphical menu interface and an implementing and an operating methods thereof developed from the aforementioned concept. In order to make the present invention more comprehensible, embodiments are described below as the examples to prove that the invention can actually be realized.

Figure 1:
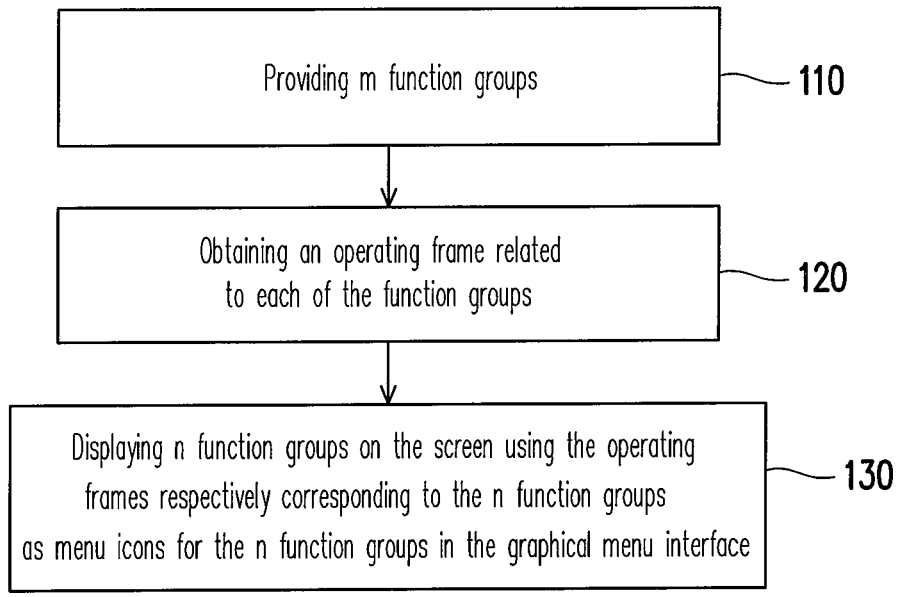
FIG. 1 is a flowchart illustrating an implementing method of a graphical menu interface according to one embodiment of the present invention.

FIG. 1 is a flowchart illustrating an implementing method of a graphical menu interface according to one embodiment of the present invention. The present embodiment illustrates the detailed steps how a graphical menu interface of a hand-held electronic device is implemented and displayed on a screen. The hand-held electronic devices include a personal digital assistant (PDA) cellular phone, a PDA, a smart cellular phone and so forth, but the range of the hand-held electronic devices is not limited herein.

Figure 2:
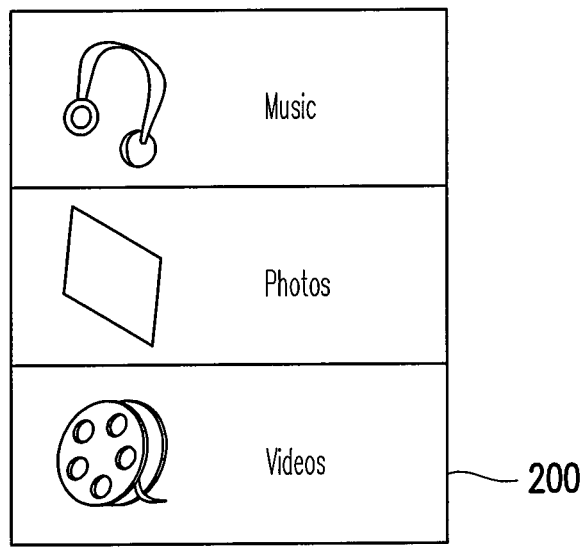
FIG. 2 is schematic view of a sub-menu of a function group according to one embodiment of the present invention.
Figure 3:
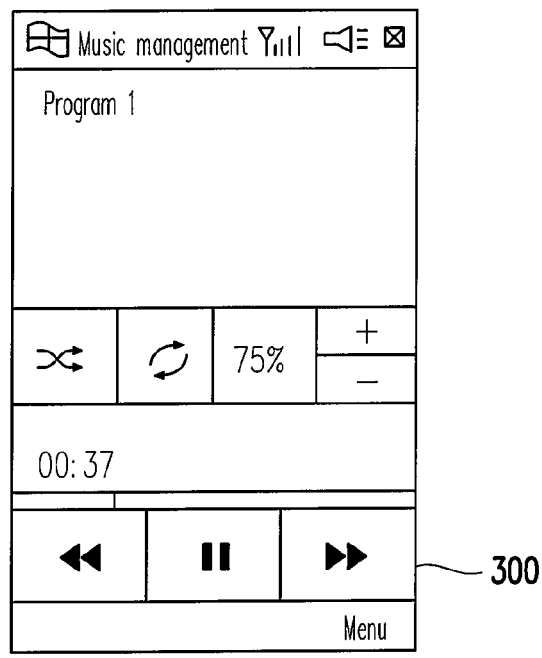
FIG. 3 is a schematic view of an operating interface of functions in a function group according to one embodiment of the present invention.

Referring to FIG. 1, as illustrated in a step 110, m function groups (m as a positive integer) in a hand-held electronic device are provided first. Each of the function groups includes at least one function. Taking the smart phone for example, the smart phone can perform numerous types of functions, which can be classified into a plurality of function groups based on their different function types, such as a PDA function group, a communication function group and a multi-media function group and the like. Afterwards, as illustrated in a step 120, operating frames respectively related to each of the function groups are obtained. The operating frames can be user interfaces related to function groups, pictures, sub-menus of function groups (as a sub-menu 200 illustrated in FIG. 2) or operating interfaces of functions in function groups (as an operating interface 300 illustrated in FIG. 3).

Figure 4:
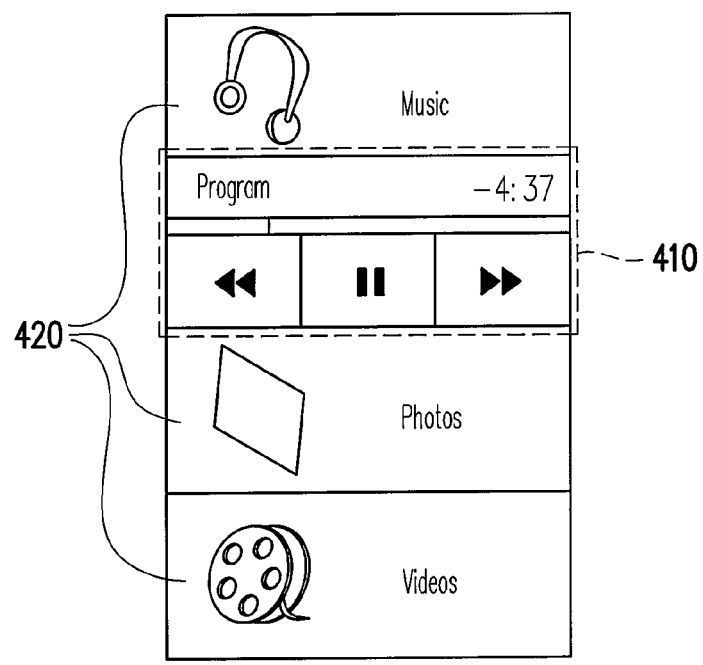
FIG. 4 is a schematic view illustrating a simplified operating interface and a simplified sub-menu of a function group according to one embodiment of the present invention.

In one embodiment, the method of obtaining operating frames is, for example, capturing the operating frame last displayed on the screen during operation of the function groups. In another embodiment, the method of obtaining operating frames is, for example, capturing one among all the operating frames related to operation of the function groups. It should be emphasized herein that the captured operating frames are not limited to those directly selected or operated by users. In other words, any user interfaces, menus, icons and frames or icons and frames likely to be displayed, which are related to operation of the function groups or may be entered during operation of the function groups, can be used as the operating frames of the function groups. In yet another embodiment, the method of obtaining operating frames is, for example, capturing an operating frame at a set interval during operation of the function groups. In addition, in another embodiment, the operating status of each of the function groups is further recorded after the step 110. A simplified operating interface (as a simplified operating interface 410 illustrated in FIG. 4) is generated correspondingly based on the operating status and combined with a sub-menu of the function group (as a sub-menu 420) so as to serve as the operating frame of the function group.

Finally, reverting to a step 130 of FIG. 1, the operating frame is used for representing a menu icon for a corresponding function group in the graphical menu interface and the graphical menu interface is then displayed on the screen. If the method of capturing the operating frame is to perform a capturing action regularly at a set interval during operation of the function groups, the operating frame last captured in the step 130 would serve as the menu icon for the corresponding function group.

If the hand-held electronic device is equipped with m function groups, the operating frames related to the m function groups will be obtained after the aforementioned steps. The graphical menu interface thus generated includes, for example, the menu icons representing the m function groups. However, in the present embodiment, only n function groups would be displayed on the screen (n is a positive integer smaller than or equal to m). Therefore, n function groups to be displayed on the screen can be first selected among the m function groups before the graphical menu interface is displayed on the screen, and only the graphical menu interface including the menu icons of the n function groups is displayed on the screen. In other words, only the menu icons corresponding to the selected n function groups would be displayed on the screen. Compared with displaying all the menu icons for the m function groups on the screen, displaying only the menu icons of the n function groups can enlarge the n menu icons, and users can thus inspect the contents represented by the n menu icons more clearly. The method of determining which n function groups to be displayed on the screen includes selecting the n function groups last performed or performed most frequently among the m function groups.

In one embodiment, when operating frames are used as menu icons of function groups and a graphical menu interface is displayed on a screen, the screen can be partitioned into x blocks (x is a positive integer larger than or equal to n). When x is equal to n, the operating frames corresponding to different function groups are displayed in each of the blocks. When x is larger than n, the operating frames corresponding to the n function groups are respectively displayed in n blocks among the x blocks. The remaining block positions not used for displaying operating frames of function groups are displayed, for example, in blank blocks, blocks filled with other colors, or figures. In the present embodiment, the method of partitioning the screen into x blocks is to partition the screen into x grids of the same size. However, how the screen is partitioned does not limit the present invention.

In another embodiment, when a graphical menu interface is displayed on a screen, for example, each operating frame is used as a first pattern of a menu icon and a function pattern corresponding to a function group added to each of the operating frames is used as a second pattern of the menu icon. A lightening treatment or a dimming treatment can be further performed on the operating frames so as to render the function patterns more obvious.

Figure 5:
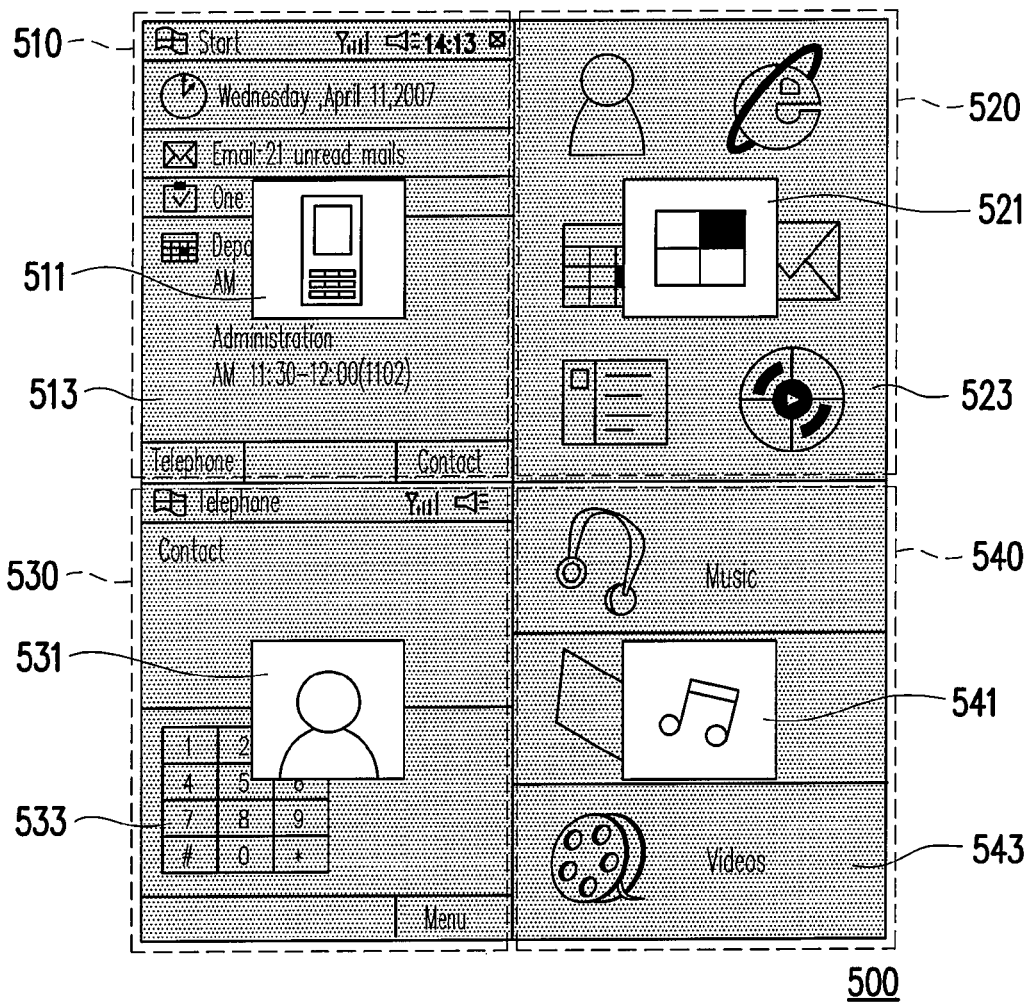
FIG. 5 is a schematic view illustrating a graphical menu interface according to one embodiment of the present invention.

FIG. 5 is a schematic view illustrating a graphical menu interface according to one embodiment of the present invention. Four function groups of a hand-held electronic device including a personal digital assistant (PDA) function group, an applied program function group, a communication function group and a multi-media function group are provided for implementing a graphical menu interface in the present embodiment. Following the steps illustrated in FIG. 1, a graphical menu interface 500 corresponding to the four function groups can be thus implemented.

Furthermore, a menu icon 510, a menu icon 520, a menu icon 530 and a menu icon 540 in the graphical menu interface 500 correspond respectively to the four different function groups: the PDA function group, the applied program function group, the communication function group and the multi-media function group. Taking the menu icon 540 for example, the menu icon 540 corresponding to the multi-media function group includes an operating frame 543 thereof and a function pattern 541 thereof. The function pattern 541 is a foreground of the menu icon 540, and the operating frame 543 may be a background of the menu icon 540 after a lightening treatment or a dimming treatment. However, using the function pattern as the foreground of the menu icon and the operating frame as the background of the menu icon is only one of the embodiments in the present invention, and is not intended to limit the invention. It should be noted that a sub-menu of the multi-media function group serves as the operating frame 543 of the multi-media function group in the present embodiment. Nevertheless, the operating frame of the corresponding function group may also be an operating interface of the functions in the function group, a user interface or a picture related to the function group and is not limited herein.

In one embodiment, each of the menu icons in the graphical menu interface 500 also includes a selection region for receiving a selection instruction to select a corresponding menu icon. The selection region is, for example, a region displaying function patterns. For example, a region displaying the function pattern 541 in the menu icon 540 is the selection region. Users can click on the region to select the menu icon 540.

The aforementioned embodiment illustrates how operating frames of function groups are used as menu icons for implementing a graphical menu interface. The following embodiment is continued from the aforementioned embodiment and further illustrates how the graphical menu interface is operated in the present invention.

Figure 6:
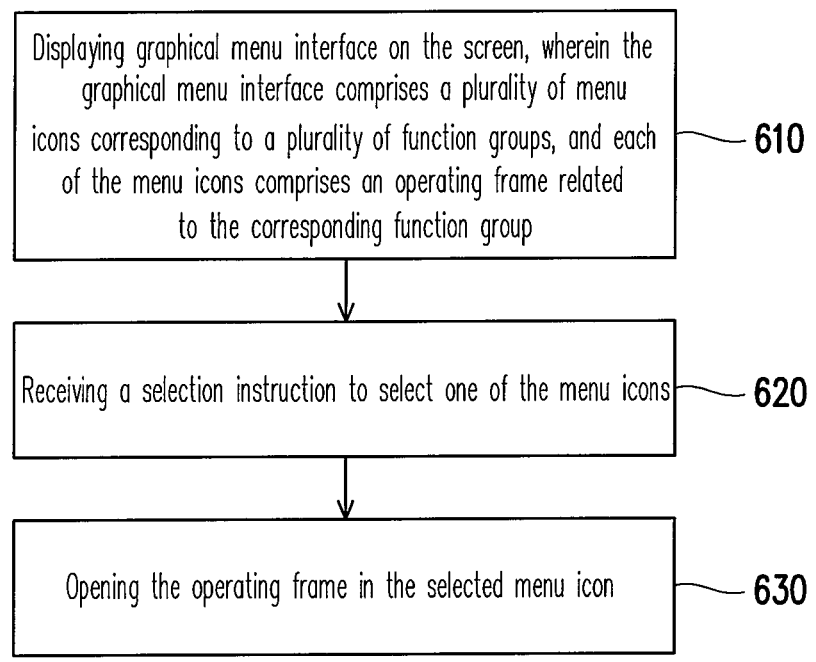
FIG. 6 is a flowchart illustrating an operating method of a graphical menu interface according to one embodiment of the present invention.

FIG. 6 is a flowchart illustrating an operating method of a graphical menu interface according to one embodiment of the present invention. Taking operation of the graphical menu interface 500 illustrated in FIG. 5 as an example, please refer to FIGS. 5 and 6 together. First, in a step 610, the graphical menu interface 500 implemented according to the steps illustrated in FIG. 1 is displayed on the screen of the hand-held electronic device. In the present embodiment, the screen of the hand-held electronic device is, for example, a touch screen, and users can operate the device by inputting or selecting through the touch screen.

As illustrated in a step 620, a selection instruction is received through the touch screen and used to select one of the menu icons. In order to facilitate the illustration, it is presumed in the following embodiments that users select the menu icon 540 corresponding to the multi-media function group in the graphical menu interface 500.

In a step 630, an operating frame (i.e., the operating frame 543) of a selected menu icon (i.e., the menu icon 540) is opened. In the present embodiment, a method of opening the operating frame includes enlarging the displayed operating frame or displaying the operating frame in full screen on the screen of the hand-held electronic device. The operating frame corresponding to the multi-media function group includes a sub-menu of the multi-media function group (such as the sub-menu 200) or an operating interface of the multi-media function group (such as the operating interface 300).

In one embodiment, if the opened operating frame is a sub-menu of a function group (such as the sub-menu 200), users can select among sub-options including music, pictures, videos and so forth in the sub-menu 200. In other words, when the hand-held electronic device receives a selection instruction corresponding to a certain sub-option, an operating frame corresponding to the selected sub-option is displayed.

Figure 7:
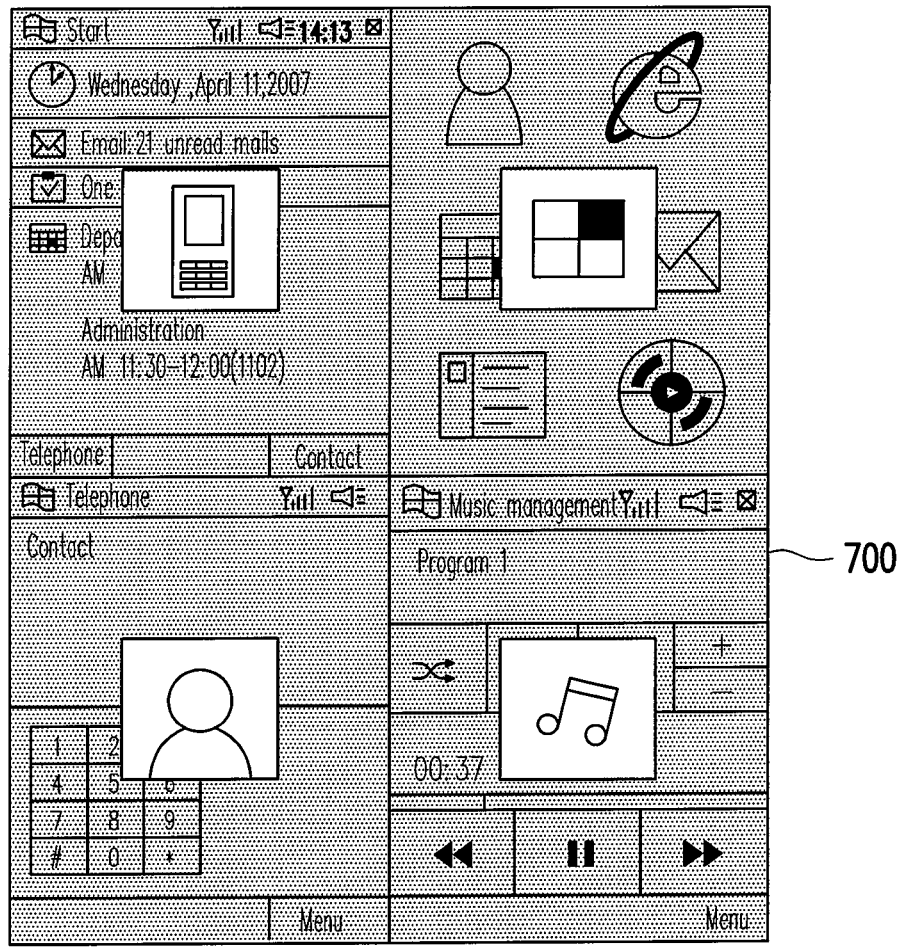
FIG. 7 is a schematic view illustrating a graphical menu interface according to one embodiment of the present invention.

In another embodiment, if the opened operating frame is an operating interface of functions in a function group (such as the operating interface 300), when the hand-held electronic device receives an operating instruction, a corresponding function in the operating interface is operated (such as playing music). In the present embodiment, during the period of playing music, operating frames are regularly captured at a set interval and operating status corresponding thereto are recorded as well. Accordingly, when a return instruction is received, the operating frame last captured is used to update the menu icon corresponding to the multi-media function group in the graphical menu interface, and the graphical menu interface is displayed on the screen of the hand-held electronic device (as a graphical menu interface 700 illustrated in FIG. 7).

Figure 8:
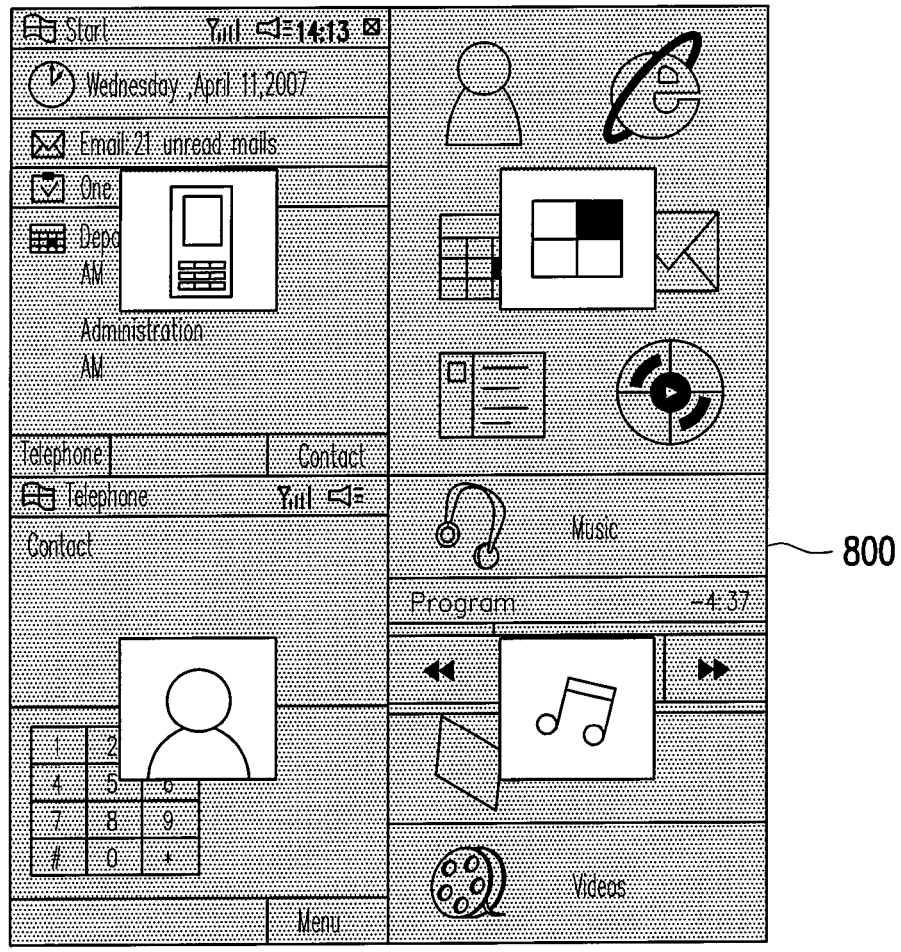
FIG. 8 is a schematic view illustrating a graphical menu interface according to one embodiment of the present invention.

In another embodiment, after the operating frame is opened, users may operate the hand-held electronic device depending on their own needs (such as clicking on sub-options in a sub-menu or performing functions in function groups). However, when the hand-held electronic device receives a return instruction, it captures the operating frame last displayed on the screen and records the operating status corresponding thereto. The captured operating frame is then used to update the corresponding menu icons in the graphical menu interface so as to further display the graphical menu interface. For example, users enter the multi-media function group by selecting the menu icon 540 in the graphical menu interface 500, and play music by selecting a music sub-option. If the hand-held electronic device receives a return instruction when the operating frame is as that illustrated in FIG. 4, the graphical menu interface 500 will be updated as a graphical menu interface 800 as illustrated in FIG. 8.

It should be noted that the aforementioned operating frame may also be a user interface or a picture related to the function group, and is not limited to the operating frame last displayed on the screen. For example, when a user is inspecting information of contacts in an address book, an operating frame displayed on the screen is only information of one contact. However, when the user finishes inspection and wants to return to the graphical menu interface, the hand-held electronic device can choose a frame of the address book including a plurality of (such as eight) contacts as the operating frame of the communication function group according to a previously recorded operating status. The menu icon corresponding to the communication function group in the graphical menu interface is then accordingly updated so that the user can choose a contact for further operation more rapidly next time when the user opens the functions in the address book.

In summary, the graphical menu interface and the implementing method and the operating method thereof in the present invention have at least the following advantages:

1. A corresponding operating frame and a function pattern in the graphical menu interface are used to represent each of the function groups, so that users can infer more intuitively the position of each of the functions in the menu interface and thereby increase the convenience in operating the menu.

2. The concept of parallel operation is emphasized in the present invention. Accordingly, each of the menu icons representing each of the function groups is displayed on the graphical menu interface at the same time so as to make it easier for users to switch among different types of function groups and render the operation more efficient.

3. When users select a function group from the graphical menu interface, the last operating status of the function group is automatically restored and the corresponding operating frame is displayed on the screen so as to make it more convenient for users to continue subsequent operation and thereby improve the convenience in use of the hand-held electronic device.

Although the present invention has been disclosed above by the embodiments, they are not intended to limit the present invention. Anybody ordinarily skilled in the art can make some modifications and alterations without departing from the spirit and scope of the present invention. Therefore, the protecting range of the present invention falls in the appended claims.

What is claimed is:

1. An implementing method of a graphical menu interface used for implementing a graphical menu interface and displaying the graphical menu interface on a screen of a hand-held electronic device, comprising:
    providing m function groups, wherein each of the function groups comprises at least one function and m is a positive integer;
    obtaining operating frames related to the function groups, wherein the operating frames are captured during operation of respective operating group;
    displaying n function groups on the screen by using the operating frames in display respectively corresponding to the n function groups, wherein n is a positive integer smaller than or equal to m, and greater than one, wherein the operating frames are characterized into multiple menu icons, each of the menu icons includes a corresponding one of the operating frames and a function pattern, wherein the operating frames in each of the menu icons are categorized by the function pattern which is in picture fonn and represents a category of the menu icon, wherein each of the menu icons is uniquely represented by the function pattern corresponding to the corresponding one of the operating frames, the function patterns for the menu icons are different to one another, so that each of the function patterns respectively identifies a corresponding one of the menu icons; and
    displaying the graphical menu interface on the screen by using each of the operating frames as a background pattern of the menu icon and using the function pattern corresponding to the function group as a foreground pattern of the menu icon, which is added to each of the operating frames.

2. The implementing method of the graphical menu interface of claim 1, before the step of displaying the n function groups on the screen, further comprising:
    determining n function groups to be displayed among the m function groups.

3. The implementing method of the graphical menu interface of claim 2, wherein the method of determining the n function groups to be displayed comprises selecting n function groups recently performed or most frequently performed.

4. The implementing method of the graphical menu interface of claim 1, wherein the step of obtaining the operating frame related to the function group comprises:
    capturing the operating frame last displayed during operation of the function group.

5. The implementing method of the graphical menu interface of claim 1, wherein the step of obtaining the operating frame related to the function group comprises:
    capturing the operating frame regularly at a set interval during operation of the function group.

6. The implementing method of the graphical menu interface of claim 5, wherein the step of using the operating frames respectively corresponding to the n function groups as the menu icons for the n function groups in the graphical menu interface comprises:
    using the operating frame last captured as the menu icon for the corresponding function group.

7. The implementing method of the graphical menu interface of claim 1, wherein the step of obtaining the operating frame related to the function group comprises:
    capturing one of all the operating frames related to operation of the function group.

8. The implementing method of the graphical menu interface of claim 1, wherein the operating frame comprises either a user interface or a picture related to the function group.

9. The implementing method of the graphical menu interface of claim 1, wherein the operating frame comprises either a sub-menu of the function group or an operating interface of one of the functions in the function group.

10. The implementing method of the graphical menu interface of claim 1, after the step of providing the function groups, further comprising:
    recording an operating status of each of the function groups;
    generating a corresponding simplified operating interface according to the operating status and combining the simplified operating interface with a sub-menu of the function group to serve as the operating frame of the function group.

11. The implementing method of the graphical menu interface of claim 1, wherein the step of displaying the graphical menu interface on the screen further comprises:
    partitioning the screen into x blocks, wherein n blocks out of the x blocks display the corresponding operating frame of each of the n function groups, and x is a positive integer larger than or equal to n.

12. The implementing method of the graphical menu interface of claim 11, wherein the step of partitioning the screen into x blocks further comprises:
    partitioning the screen into x grids.

13. The implementing method of the graphical menu interface of claim 1, wherein the step of displaying the graphical menu interface on the screen further comprises either lightening or dimming the operating frames.

14. An operating method of a graphical menu interface used for operating a graphical menu interface displayed on a screen of a hand-held electronic device, comprising:
    displaying the graphical menu interface on the screen by:
        providing m function groups, wherein each of the function groups comprises at least one function and m is a positive integer;
        obtaining operating frames related to the function groups, wherein the operating frames are captured during operation of respective operating group;
        displaying n function groups on the screen by using the operating frames in display respectively corresponding to the n function groups, wherein n is a positive integer smaller than or equal to in, and greater than one, wherein the operating frames are characterized into multiple menu icons, each of the menu icons includes a corresponding one of the operating frames and a function pattern, wherein the operating frames in each of the menu icons are categorized by the function pattern which is in picture form and represents a category of the menu icon, wherein each of the menu icons is uniquely represented by the function pattern corresponding to the corresponding one of the operating frames, the function patterns for the menu icons are different to one another, so that each of the function patterns respectively identifies a corresponding one of the menu icons; and displaying the graphical menu interface on the screen by using each of the operating frames as a background pattern of the menu icon and using the function pattern corresponding to the function group as a foreground pattern of the menu icon, which is added to each of the operating frames;

receiving a selection instruction to select one of the menu icons; and opening the operating frame in the selected menu icon.

15. The operating method of the graphical menu interface of claim 14, wherein the step of opening the operating frame in the selected menu icon further comprises:

enlarging the displayed operating frame or displaying the operating frame in full screen on the screen.

16. The operating method of the graphical menu interface of claim 14, wherein the operating frame comprises either a user interface or a picture related to the function group.

17. The operating method of the graphical menu interface of claim 14, wherein the operating frame comprises either a sub-menu of the function group or an operating interface of one of the functions in the function group.

18. The operating method of the graphical menu interface of claim 17, after the step of opening the operating frame of the selected menu icon, further comprising:

receiving a selection instruction to select a sub-option of the sub-menu in the operating frame and displaying the operating frame corresponding to the sub-option.

19. The operating method of the graphical menu interface of claim 17, after the step of opening the operating frame in the selected menu icon, further comprising:

receiving an operating instruction to perform the corresponding function in the operating interface.

20. The operating method of the graphical menu interface of claim 19, wherein the step of performing the corresponding function in the operating interface further comprises:

capturing the operating frame regularly; and recording an operating status of the operating frame.

21. The operating method of the graphical menu interface of claim 20, after the step of capturing the operating frame regularly, further comprising:

receiving a return instruction; and displaying the graphical menu interface using the operating frame last captured to update the corresponding menu icon in the graphical menu interface.

22. The operating method of the graphical menu interface of claim 14, after the step of opening the operating frame in the selected menu icon, further comprising:

receiving a return instruction;

capturing the operating frame last displayed;

recording an operating status of the operating frame; and displaying the graphical menu interface using the captured operating frame to update the corresponding menu icon in the graphical menu interface.

23. The operating method of the graphical menu interface of claim 14, wherein the screen comprises a touch screen, and the step of receiving the selection instruction to select one of the menu icons comprises:

receiving the selection instruction through the touch screen.

24. A hand-held electronic device comprising a graphical menu interface for operating the hand-held electronic device, and the hand-held electronic device is configured for:

providing m function groups, wherein each of the function groups comprises at least one function and m is a positive integer;

obtaining operating frames related to the function groups, wherein the operating frames are captured during operation of respective operating group;

displaying n function groups on the screen by using the operating frames in display respectively corresponding to the n function groups, wherein n is a positive integer smaller than or equal to m, and greater than one, wherein the operating frames are characterized into multiple menu icons, each of the menu icons includes a corresponding one of the operating frames and a function pattern, wherein the operating frames in each of the menu icons are categorized by the function pattern which is in picture form and represents a category of the menu icon, wherein each of the menu icons is uniquely represented by the function pattern corresponding to the corresponding one of the operating frames, the function patterns for the menu icons are different to one another, so that each of the function patterns respectively identifies a corresponding one of the menu icons; and displaying the graphical menu interface on the screen by using each of the operating frames as a background pattern of the menu icon and using the function pattern corresponding to the function group as a foreground pattern of the menu icon, which is added to each of the operating frames.

25. The graphical menu interface of claim 24, wherein each of the menu icons further comprises:

a selection region used for receiving a selection instruction to select the corresponding menu icon, wherein the selection region comprises a region displaying the function pattern.

26. The graphical menu interface of claim 24, wherein the operating frame comprises a frame last displayed during operation of the function group.

27. The graphical menu interface of claim 24, wherein the operating frame comprises a last captured frame among the frames regularly captured at a set interval during operation of the function group.

28. The graphical menu interface of claim 24, wherein the operating frame comprises either a user interface or a picture related to the function group.

29. The graphical menu interface of claim 24, wherein the operating frame comprises either a sub-menu of the function group or an operating interface of one of the functions in the function group.

* * * * *